United States Patent Office 3,430,926
Patented Mar. 4, 1969

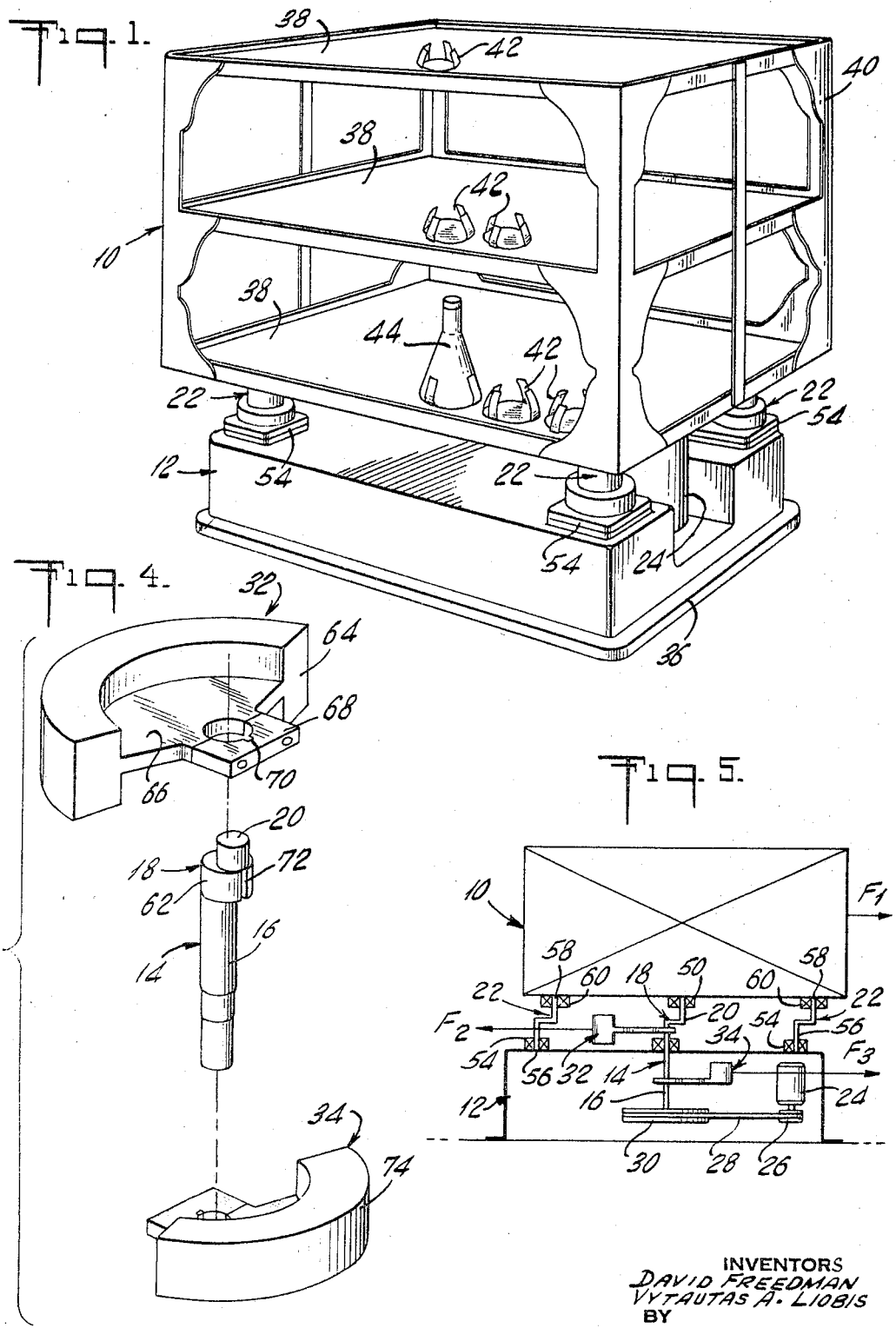

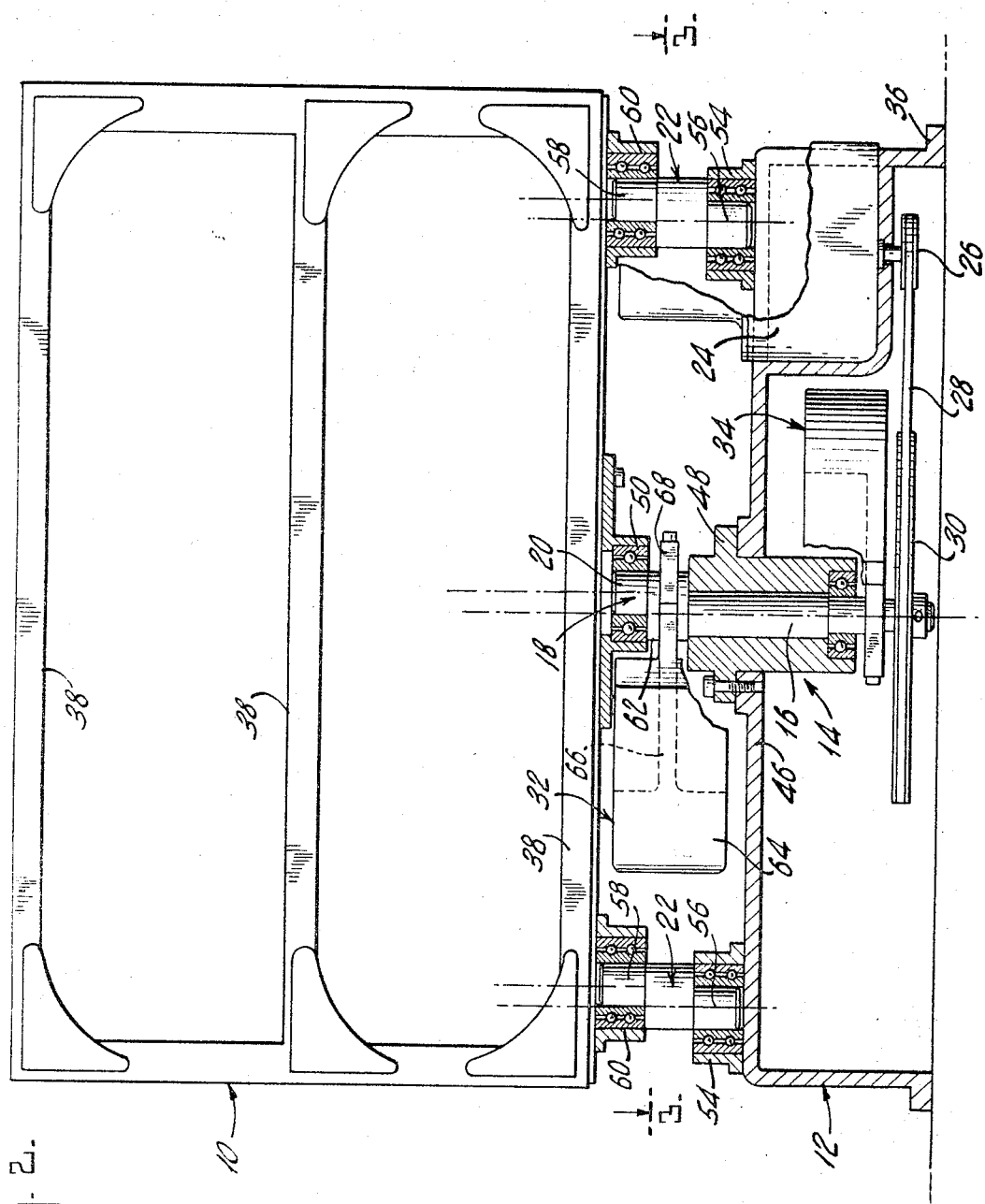

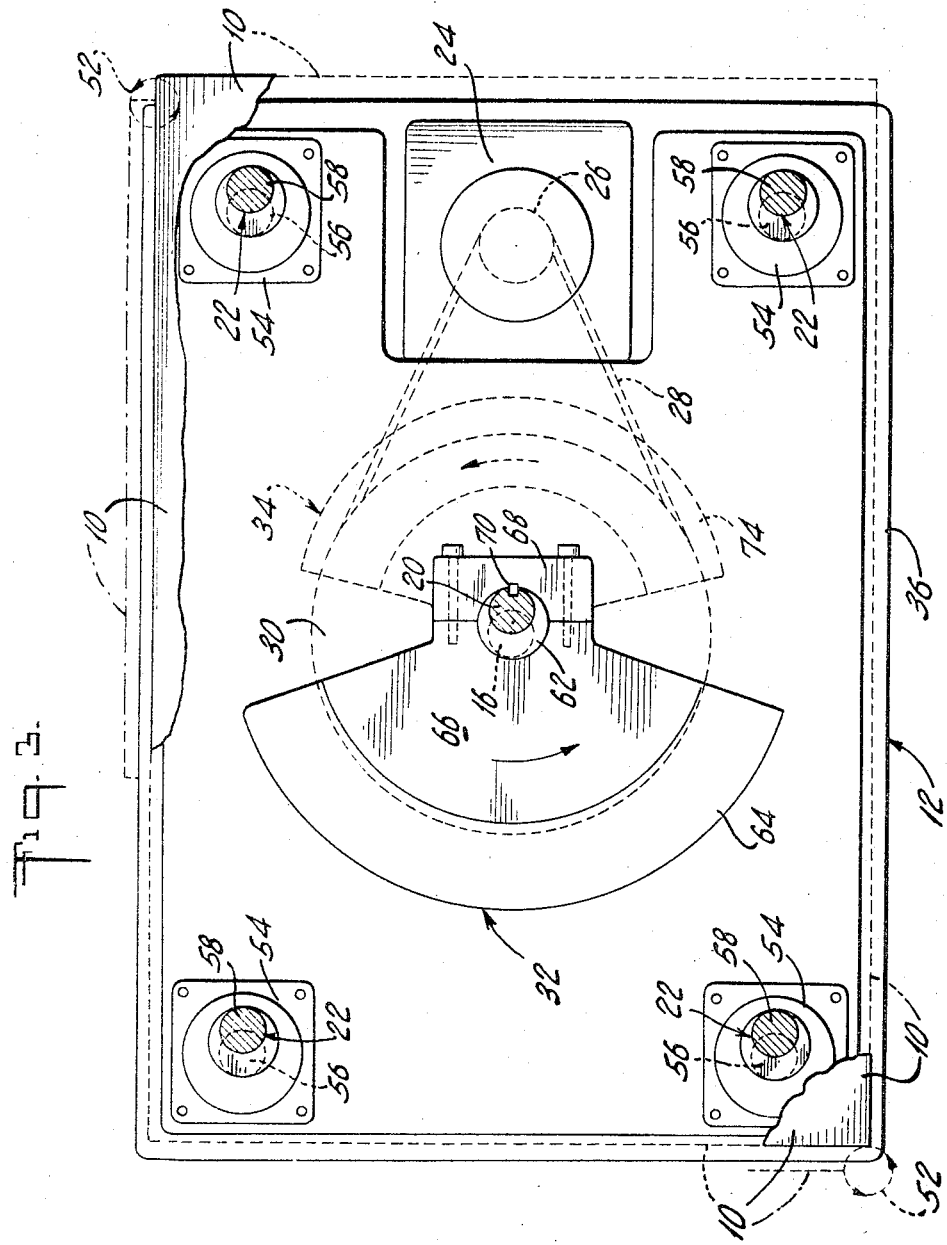

3,430,926
COUNTERWEIGHT SYSTEM FOR
SHAKER APPARATUS
David Freedman, Highland Park, and Vytautas A. Liobis,
Plainfield, N.J., assignors to New Brunswick Scientific
Co., Inc., a corporation of New Jersey
Filed Sept. 12, 1967, Ser. No. 667,243
U.S. Cl. 259—54                          11 Claims
Int. Cl. B01f 13/00

ABSTRACT OF THE DISCLOSURE

A shaker apparatus which has a platform for horizontally shaking a load which is carried by the platform. A base which has a mass considerably greater than that of the platform is situated beneath the latter, and a drive means is carried by the base and operatively connected with the platform for horizontally shaking the platform with respect to the base. A counterbalance means is operatively connected with the drive means to move therewith for horizontally balancing the apparatus as well as for substantially eliminating tilting moments about a horizontal axis, so that the base need not be fixed to any stationary structure and instead can simply rest on any supporting surface without any tendency for the apparatus to creep or "walk" along this supporting surface during operation of the apparatus even though the latter is not bolted or otherwise fixed to a stationary structure.

Background of the invention

The invention relates to shaker apparatus.

Thus, the invention relates to apparatus for shaking a load so as to change the condition thereof in a desired manner. For example, the shaker apparatus of the invention can be used for shaking mixtures situated in suitable flasks so as to provide homogeneous mixtures therein, the material which is included in the flasks and which constitutes therewith the load which is acted upon being either wholly or in part liquid, solid, or any combination thereof.

Although shaker apparatus of the above general type is known, the known apparatus suffers from several drawbacks. These drawbacks result primarily from the fact that the shaker apparatus experiences during its operation unavoidable unbalanced vibrations which set up undesirably large unbalanced forces. Because of these factors it is difficult to achieve with the conventional apparatus results which can be precisely reproduced during successive operations of the apparatus. Also, it is essential with the conventional apparatus to bolt the latter to a massive stationary structure which will absorb the unbalanced forces. Not only does this latter necessity of fixing the apparatus create inconveniences in and of itself, because of the operations required in connection with the fixed mounting of the apparatus, but in addition the fixed mounting of the conventional apparatus limits the latter to only one location and prevents the apparatus from being conveniently set up on any available table top, for example.

Furthermore precise uniformity of shaking is mandatory and the better the control of the shaking, the greater is the value and dependability of the examination to the scientist-user. Thus uniformity of control of the horizontal shaking for precise reproducibility is derived and the better the balancing system of the apparatus the better the control and reproducibility achieved. Additionally, the speed of shaking can be increased and in certain experiments it may be desirable to operate the shaker at higher speeds that the capacity of existing apparatus and these higher speeds can be utilized in the present apparatus consistent with the prescribed uniformity because the problem of balancing which heretofore limited the speed of existing apparatus has been obviated pursuant to the present invention.

Summary of the invention

It is therefore a primary object of the present invention to provide a shaker apparatus of the above general type which will, however, avoid the above drawbacks.

Thus, it is an object of the invention to provide a shaker apparatus which is indeed capable of precisely reproducing results achieved during successive operations.

Furthermore, it is an object of the invention to provide a shaker apparatus which need not be fixed to a stationary structure so that the apparatus of the invention can be used on any convenient supporting surface.

In particular, it is an object of the present invention to provide a shaker apparatus of the above general type which is capable of substantially eliminating substantially all unbalanced forces even though the loads vary considerably and without requiring fixing of the apparatus to a stationary structure.

In addition, it is an object of the invention to provide a structure which will accomplish the above objects while at the same time being composed in its entirety of simple rugged elements which operate very reliably and which are relatively inexpensive to manufacture and assemble.

The structure of the invention has a shaker platform which carries the load and a base which is situated beneath the shaker platform and which has a mass which may be substantially greater than that of the platform. A drive means is carried by the base and is operatively connected with the platform for horizontally shaking the latter, and a counterbalance means of the invention is connected to the drive means to move therewith and coacts with the shaker platform for horizontally balancing the latter as well as for substantially eliminating all tilting moments which tend to tilt the apparatus about a horizontal axis, so that in this way, without fixing the base to a stationary structure, it becomes possible to operate the apparatus without experiencing undesirable creeping or "walking" thereof.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

Brief description of the drawings

For a fuller understanding of the invention, reference is had to the following description taken in connection with the accompanying drawings, in which:

FIG. 1 is a perspective illustration of a shaker apparatus constructed according to the invention;

FIG. 2 is a partly schematic sectional elevation of the structure of FIG. 1, the sectional parts of FIG. 2 being taken in vertical planes which respectively contain the axes of the drive shaft and a pair of idler eccentrics;

FIG. 3 is a sectional plan view taken along line 3—3 of FIG. 2 in the direction of the arrows;

FIG. 4 is an exploded perspective illustration of the drive shaft and counterweight assembly; and FIG. 5 is a schematic representation of the manner in which the structure of the invention operates.

Description of a preferred embodiment

Referring first to FIG. 5 of the drawings, there is schematically shown therein the apparatus of the invention and the manner in which it operates. The apparatus includes a shaker platform 10 provided with a suitable number of tiers for carrying the load. Situated beneath the platform 10 is a base 12 which has a mass greater than that of the platform 10. A drive means 14 is carried by the base 12 and is operatively connected with the platform 10 for horizontally shaking the latter. This drive means 14 includes a vertically extending drive shaft which has a lower elongated portion 16 extending through the top wall of the base 12 into the hollow interior thereof and having an axis which coincides with the axis of rotation of the drive means 14. The drive means 14 has at its drive shaft an upper portion 18 situated upwardly beyond the base 12 between the latter and the platform 10 and terminating in an upper eccentric journal 20 which is directly connected with the platform 10 in a suitable bearing carried thereby and which has an axis which is parallel to and spaced from the axis of rotation of the drive means 14. A plurality of idler eccentrics 22 have lower journal portions situated in suitable bearings carried by the base 12 at the top wall thereof and upper journal portions situated in suitable bearings carried by the platform 10, and these idler eccentrics 22 form a means for supporting the platform 10 substantially exclusively for horizontal shaking movement. The parallel axes of the upper and lower journal portions of each idler eccentric 22 are spaced from each other by a distance equal to the space between the axis of the journal 20 and the axis of rotation of the drive shaft 16.

The drive means is driven from a motor 24 carried by the base 12 and driving a pulley 26 which transmits the drive through a belt 28 to a pulley 30 coaxially fixed to the bottom end of the drive shaft 16. The apparatus of the invention includes a counterbalance means connected to the drive means 14 to move therewith for horizontally balancing the apparatus as well as for substantially eliminating tilting moments about a horizontal axis, so that in this way the base 12 need not be bolted or otherwise fixed to any stationary structure and can simply rest on any suitable horizontal supporting surface without any tendency to creep or "walk" thereon during operation of the apparatus even though the base 12 is not fixed to the supporting surface. This counterbalance means includes at least a pair of counterweights, although more than two counterweights can be used, if desired. In the illustrated example there are a pair of counterweights 32 and 34 fixed to the drive shaft 16 and axially spaced therealong. In addition, it will be noted that the weights 32 and 34 extend in diametrically opposed directions from the axis of rotation of the drive means 14. The upper counterweight 32 is larger than the lower counterweight 34 and is situated upwardly beyond the base 12 between the latter and the platform 10, while the weight 34 is housed within the base 12.

The apparatus operates in the following manner:

The platform 10 and the load carried thereby provide the force $F_1$ indicated in FIG. 5, while the lower smaller weight 34 provides the force $F_3$ acting in the same direction as the force $F_1$. The larger upper weight 32 provides the force $F_2$ which is diametrically opposed to the forces $F_1$ and $F_3$. With this arrangement a substantially horizontal balance of the apparatus is achieved. Also, because of the vertical spacing of the counterweights 32 and 34 along the axis of rotation of the drive means 14, there is a substantial elimination of all tilting moments which tend to tilt the apparatus about a horizontal axis and thus the base 12 will have no tendency to creep or "walk" on the supporting surface on which it rests. Because of the mass of the base 12, a certain amount of the unbalanced forces will simply be absorbed by the mass of the base 12, with the result that the load can vary considerably while still maintaining the horizontal balance and the elimination of tilting moments.

Referring now to FIGS. 1–4, the base 12 may be made of cast iron, for example, and has at its botttom end an outwardly directed flange 36 which may, if desired, have a number of levelling feet threaded therethrough. The base 12 need not be bolted down to any fixed supported structure.

The shaker platform 10 is situated over and spaced from the base 12 and in the illustrated example has three tiers 38 made of sheet metal and situated in horizontal planes, these tiers 38 being interconected by the frame structure 40 which together with the tiers 38 are made of a relatively light sheet metal, thus giving the base 12 its mass which may be considerably greater than that of the platform 10. The tiers 38 carry suitable spring clip assemblies 42 which serve to mount the load 44 on the platform 10. This load takes the form, for example, of suitable flasks having therein the material which is to be worked on by the apparatus.

The top wall 46 of the base 12 is suitably recessed to accommodate the motor 24 whose drive shaft extends through an opening in the top wall 46 to be fixed in the hollow interior of the base 12 to the driving pulley 26 which drives the pulley 30 of the drive means 14 through the belt 28 as described above. The elongated drive shaft 16 has a vertical axis of rotation coinciding with the axis of the pulley 30, and the shaft 16 is supported for rotary movement in a suitable bearing assembly 48 bolted to the top wall 46 and passing through a substantially central opening thereof. The shaft 16 terminates at its upper portion which extends upwardly beyond the base 12 in a journal 20 received in the bearing assembly 50 which is centrally fixed to the lower surface of the platform 10. The axis of the journal 20 is parallel to and spaced from the axis of rotation of the drive means 14 which coincides with the axis of the shaft 16, and thus the eccentric journal 20 will provide for the platform 10 an eccentric rotary movement indicated by the circular arrows 52 in FIG. 3. In this way horizontal shaking is achieved.

In the region of the corners of its top wall 46, the base 12 carries bearing assemblies 54 which receive the lower journals 56 of the idler eccentrics 22, and the upper journals 58 thereof are received in bearing assemblies 60 fixed to the lower surface of the platform 10 in the region of the corners thereof. The distance between the parallel axes of the journals 56 and 58 of each idler eccentric 22 is equal to the distance between the axis of the journal 20 and the axis of the drive shaft 16, so that the idler eccentrics 22 support the platform during the horizontal shaking thereof provided by way of the drive means 14.

The upper portion of the shaft 16, which extends upwardly beyond the base 12, has next to the upper eccentric journal 20 an intermediate eccentric portion 62. This intermediate eccentric portion 62 has a diameter larger than that of the lower portion of shaft 16 and the journal 20, and the axis of the intermediate eccentric portion 62 is parallel to the axes of the drive shaft 16 and the journal 20 and situated therebetween in a plane which contains the axes of the shaft 16 and the journal 20, as is particularly apparent from FIG. 3.

The upper counterweight 32 is fixed to this intermediate eccentric portion 62 for rotary movement therewith. This upper counterweight 32 has an outer arcuate peripheral weight portion 64 extending along a circle whose center is in the axis of intermediate eccentric portion 62, and the outer arcuate peripheral weight portion 64 is integral with a flat plate portion 66 which extends part of the way around the intermediate eccentric portion 62. An outer plate 68 is bolted to the plate portion 66 and is provided with a keyway 70 which registers with a keyway 72 extending axially of the intermediate eccentric portion 62, so that with a key extending into the registering keyways 70 and 72 the counterweight 32 is fixed to the drive means 14 between the base 12 and the platform 10 for rotary movement with the drive means 14 about an axis which is spaced from the axis of rotation of the drive means 14 but at a distance from the latter axis which is less than the distance of the axis of the journal 20 from this axis of rotation.

The lower smaller weight 34 is fixedly keyed to the lower end portion of the shaft 16 through a structure which may be the same as that of the weight 32. The lower weight 34 has an outer arcuate peripheral weight portion 74 which also extends along a circle whose center is in the axis of rotation of the drive means 14.

As is particularly apparent from FIG. 3, the radius of the outer arcuate weight portion 74 of the counterweight 34 is smaller than that of the outer arcuate weight portion 64 of the weight 32. Moreover, these weights extend in diametrically opposed directions from the axis of rotation of the drive means. However, it will be noted from FIG. 3 that the arcuate peripheral weight portions 64 and 74 extend through the same angle about the axis of rotation of the drive means, and in the illustrated example this angle may be on the order of 150° for each of the counterweights.

Thus, it is apparent that with the structure of the invention an exceedingly simple and compact assembly is provided. All of the components are of a simple rugged construction, and they are very easy to assemble. The entire apparatus need only be placed on a suitable supporting surface without any possibility of undesirable creeping or "walking" during operation of the apparatus. Furthermore, it is possible to precisely reproduce results during successive operations. It will be noted in particular that advantage is taken of the available space beneath the platform 10 not only with respect to the interior of the base 12 but also with respect to the space between the base 12 and the platform 10 which is utilized to accommodate the larger weight 32.

It will thus be seen that the objects set forth above, among those made apparent from the preceding dscription, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a shaker aparatus, a shaker platform for carrying a load, a base situated beneath said platform and having a substantial mass, drive means carried by said base and operatively connected with said platform for horizontally shaking the latter with respect to said base, and counterbalance means operatively connected to said drive means to move threwith for horizontally balancing the apparatus during operation thereof and for substantially eliminating tilting moments about a horizontal axis, so that the apparatus can be stably maintained at a predetermined location without fixing the base to a stationary structure.

2. The comination of claim 1 and wherein said drive means includes a rotary drive shaft having a vertical axis of rotation, and said counterbalance means including at least a pair of counterbalance weights fixed to said shaft for rotation therewith, respectively extending in diametrically opposed directions from said axis, and respectively displaced vertically one with respect to the other along said axis.

3. The combination of claim 2 and wherein said weights have unequal magnitudes, respectively.

4. The combination of claim 3 and wherein said weights each have outer peripheral weight portions extending along an arc of a circle whose center is adjacent said axis, and the radius of one of said arcuate peripheral weight portions being different from the radius of the other of the arcuate peripheral weight portions.

5. The combination of claim 4 and wherein said arcuate peripheral portions of said diametrically opposed counterbalance weights respectively extend through equal angles about said axis.

6. The combination of claim 2 and wherein said drive shaft has an upper portion extending upwardly beyond said base and operatively connected to said platform, and one of said weights being fixed to said drive shaft at said upper portion thereof between said platform and said base.

7. The combination of claim 6 and wherein said upper portion of said shaft terminates in an eccentric journal operatively connected with said platform and having an axis parallel to and spaced from said axis of rotation.

8. The combination of claim 7 and wherein a pluarlity of idler eccentrics are operatively connected on the one hand to said base and on the other hand to said platform to support the latter on said base for horizontal shaking movement, and said idler eccentrics respectively having connected to said platform and to said base journals which have parallel axes spaced from each other by the same distacne as that between said axis of rotation and said axis of said journal at said upper end portion of said drive shaft.

9. The combination of claim 7 and wherein said upper portion of said drive shaft has between said journal and said axis of rotation an intermediate eccentric portion having an axis located between, parallel to, and situated in a plane which contains said axis of rotation and said journal axis, and said one weight being fixed to said intermediate eccentric portion.

10. The combination of claim 9 and wherein said one weight is situated at a side of said axis of rotation which is diametrically opposed to the side of the latter axis where said axis of said journal and intermediate eccentric portion are located.

11. The combination of claim 1 and wherein a support means is carried by said base and is operatively connected with said platform for supporting the latter substantially exclusively for horizontal movement.

References Cited

UNITED STATES PATENTS 3,286,939  11/1966  Karpenko _____ 259—72

ROBERT W. JENKINS, *Primary Examiner.*